United States Patent [19]

Vogel et al.

[11] B  3,985,163

[45] Oct. 12, 1976

[54] APPARATUS AND METHOD FOR FORMING CIRCULAR DYNAMOELECTRIC MACHINE FIELD WINDINGS BY PUSHING

[75] Inventors: Ralph A. Vogel, Three Rivers, Mich.; Patrick L. Grawcock, Fort Wayne, Ind.

[73] Assignee: Essex International, Inc., Fort Wayne, Ind.

[22] Filed: June 25, 1975

[21] Appl. No.: 590,158

[44] Published under the second Trial Voluntary Protest Program on February 10, 1976 as document No. B 590,158.

Related U.S. Application Data

[63] Continuation of Ser. No. 473,679, May 28, 1974, abandoned.

[52] U.S. Cl. ............................. 140/92.1; 29/205 D; 29/596; 29/605
[51] Int. Cl.² ........................................ H02K 15/04
[58] Field of Search ................. 140/92.1, 1; 29/596, 29/605, 205 R, 205 D; 242/1.1 R, 1.1 A, 7.03

[56] References Cited

UNITED STATES PATENTS

| | | | |
|---|---|---|---|
| 3,347,474 | 10/1967 | Frank | 242/1.1 R |
| 3,514,837 | 6/1970 | Smith | 29/205 D |
| 3,579,791 | 5/1971 | Arnold | 29/205 D |
| 3,714,973 | 2/1973 | Kieffer et al. | 140/92.1 |
| 3,791,419 | 2/1974 | Arick et al. | 140/92.1 |

*Primary Examiner*—Carl E. Hall

[57] ABSTRACT

An apparatus and method for placing magnet wire in slots respectively defined by the blades of coil insertion apparatus which lie on an imaginary cylinder thereby to form a circular dynamoelectric machine field winding. The wire is pushed and simultaneously guided in a circular path which overlaps the cylindrical array of blades and which is aligned with the open ends of two of the slots whereby the wire is pushed into the two slots.

6 Claims, 3 Drawing Figures

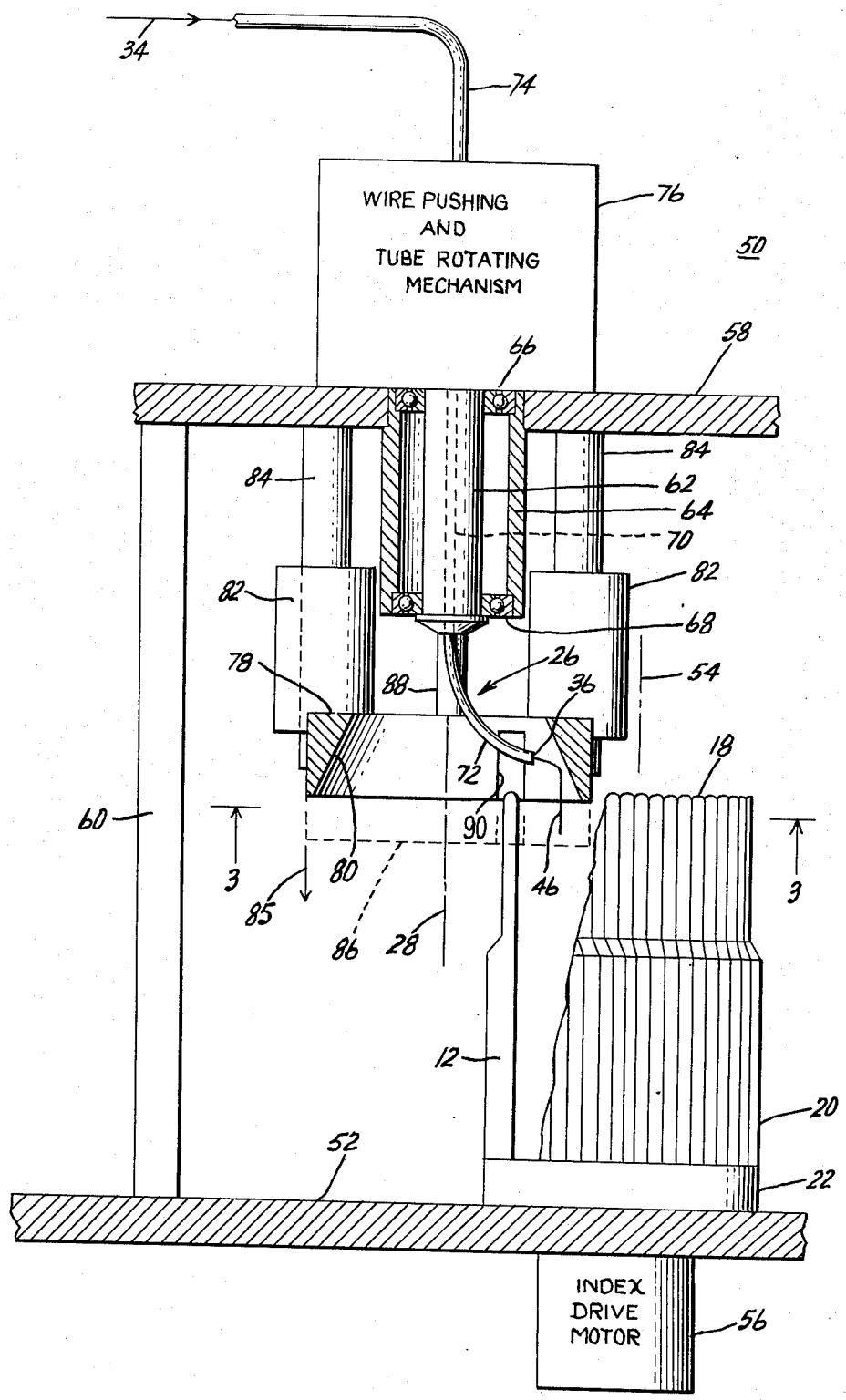

APPARATUS AND METHOD FOR FORMING CIRCULAR DYNAMOELECTRIC MACHINE FIELD WINDINGS BY PUSHING

CROSS-REFERENCE TO RELATED APPLICATION

This is a Continuation of co-pending Application Ser. No. 473,679, filed May 28, 1974, now abandoned by Patrick L. Grawcock entitled "APPARATUS AND METHOD FOR FORMING CIRCULAR DYNAMO-ELECTRIC MACHINE FIELD WINDINGS BY PUSHING."

BACKGROUND OF THE INVENTION

1. Field of the Invention

This invention relates generally to an apparatus and method for forming circular dynamoelectric machine field windings by pushing.

2. Description of the Prior Art

In the past, two different types of apparatus have been employed for placing dynamoelectric machine field windings in the slots of a stator core member. In the so-called in-place or gun winder, a free end of the wire is secured and a gun is oscillated through the bore of the core member thereby withdrawing the wire from a source and placing it directly in the desired slots; since the free end of the wire is fixed, the wire is in essence wound around selected teeth which define the slot thereby placing the wire under tension. A typical gun winder is shown for example in U.S. Pat. No. 3,025,008 assigned to the assignee of the present application.

In the so-called coil-insertion or coil-injection apparatus, prewound coils are first placed on a circular array of elongated blades, the stator core is then positioned on the blades with the blades respectively engaging the inner ends of the stator core teeth, and the coils are then pushed bodily into the stator core member slots. Such coil insertion apparatus is shown for example in U.S. Pat. Nos. 2,432,267, 3,324,536, and 3,447,225, the latter patent being assigned to the assignee of the present application. The coils for use with such coil insertion apparatus are typically formed by securing the free end of the wire to a coil form and then winding or wrapping the wire around the coil form as the wire is withdrawn from a source, the wire again being placed in tension as it is being wound. Typical apparatus for prewinding such coils is shown for example in U.S. Pat. No. 3,575,219, also assigned to the present applicant.

Application Ser. No. 331,992 filed Feb. 22, 1973 by Robert E. Arick and Ralph A. Vogel and assigned to the assignee of the present application discloses apparatus and methods for pushing magnet wire into the slots respectively defined by spaced elements which may be the teeth of the stator core member or the blades of coil insertion apparatus thereby to form a dynamoelectric machine field winding.

SUMMARY OF THE INVENTION

In accordance with the invention, an apparatus and method is provided for placing magnet wire in the slots respectively defined by the blades of coil insertion apparatus which lie on an imaginary cylinder thereby to form a circular dynamoelectric machine field winding. The apparatus of the invention, in its broader aspects, includes means for guiding the wire towards the blades and means for pushing the wire through the guide means. Means are provided for moving the guide means relative to the blades in a circular path which overlaps the cylindrical array of blades and which is aligned with the open ends of two of the slots whereby the wire is pushed into those two slots.

In a preferred embodiment of the invention, means are provided concentrically surrounding the guide means for confining the wire in the circular path. The confining means may be axially movable between first and second positions in which the wire is respectively pushed in first and second circular paths having first and second diameters thereby to form two concentric coils.

The method of the invention, in its broader aspects, includes the steps of pushing the wire in a circular path which overlaps the cylindrical array and is aligned with the open ends of two of the slots.

It is accordingly an object of the invention to provide an improved apparatus for forming circular dynamoelectric machine field windings by pushing.

Another object of the invention to provide an improved method of forming dynamoelectric machine field windings by pushing.

A further object of the invention is to provide an improved apparatus for forming concentric, circular dynamoelectric machine field windings by pushing.

Yet another object of the invention is to provide an improved method of forming concentric, circular dynamoelectric machine field windings by pushing.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 2 is a fragmentary side view, partly in cross section and partly broken away, showing the apparatus of the invention.

DESCRIPTION OF THE PREFERRED EMBODIMENT

Figure 1:
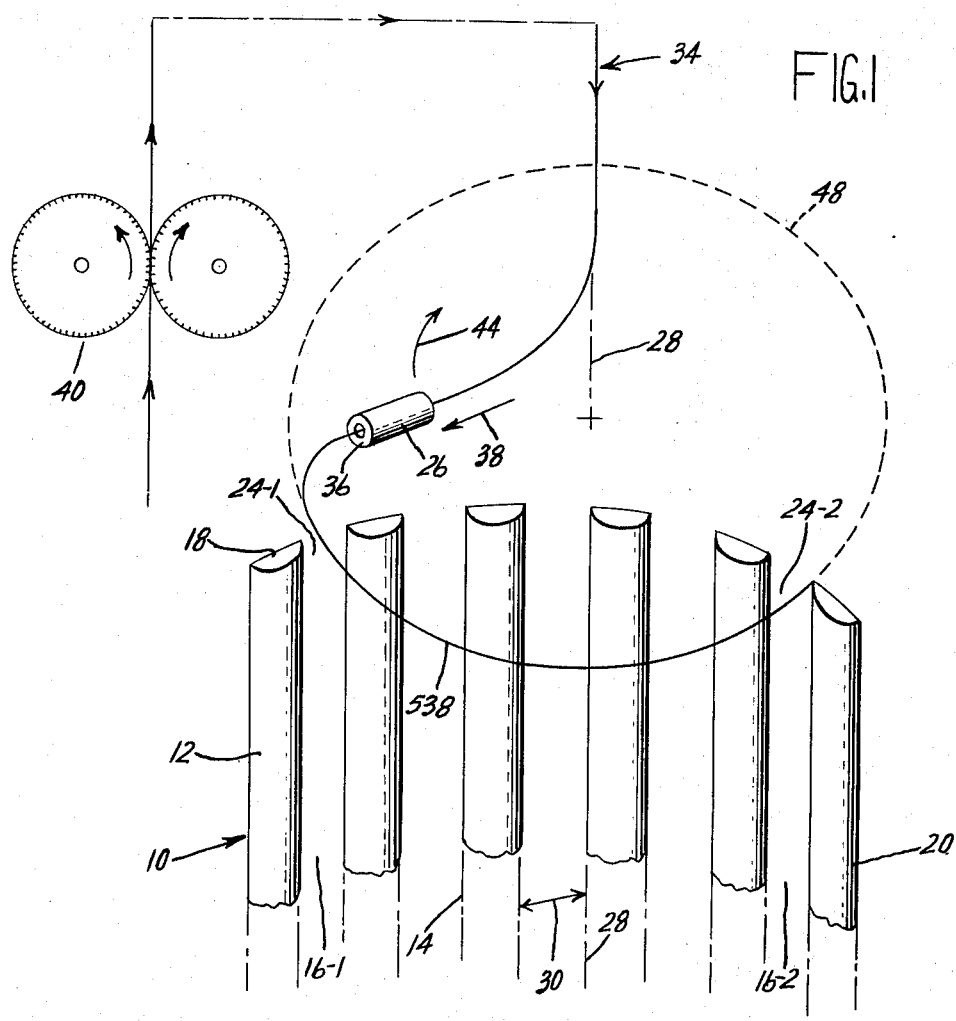
FIG. 1 is a fragmentary, schematic view illustrating the method of the invention.

Referring now to FIG. 1 there is shown portion 10 of a circular array of blades 12 of coil insertion apparatus, blades 12 lying on an imaginary cylinder having axis 14 and defining slots 16 therebetween. Blades 12 have distal ends 18 and proximal ends 20 mounted on support member 22 (FIG. 2). Slots 16 have open ends 24 defined by distal ends 18.

Wire dispensing gun 26 is disposed in radially spaced relationship with respect to axis 28, gun 26 extending generally radially with respect to axis 28. In the preferred embodiment, axis 28 is spaced from the imaginary cylinder defined by the circular array of blades 12 in parallel relationship with axis 14, as shown at 30. Gun 26 lies in a plane spaced from distal ends 18 of blades 12 on the side thereof remote from proximal ends 20. Wire 34 is pushed through gun 26 and out of dispensing end 36 in direction 38 by means such as rollers 40, 42 shown in FIG. 1.

In the method of the invention, gun 26 is moved in a circular path about axis 28, as shown by arrow 44, as wire 34 is continuously pushed through gun 26 in direction 38. The radial spacing of dispensing end 36 from its axis of rotation 28, the ratio of the speed of rotation of gun 26 about axis 28, and the rate of advance of wire 34 in direction 38 are proportioned and arranged so that wire 46 is pushed from dispensing end 36 of gun 26 in circular path 48 which overlaps the imaginary cylinder defined by blades 12 and is aligned with open ends 24-1 and 24-2 of two of the slots 16-1, 16-2, respectively, the weight of the wire as well as the pushing force thereon causing the thus-formed circular coils of wire to enter and accumulate in slots 16-1, 16-2.

Figure 3:
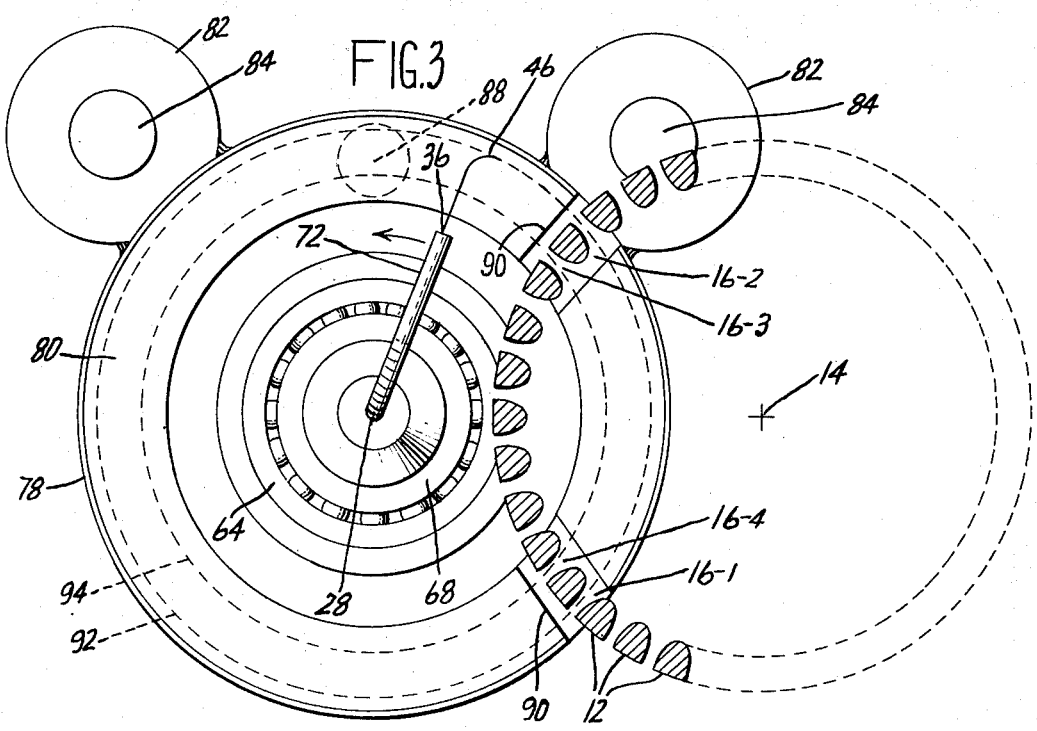
FIG. 3 is a cross-sectional view taken generally along the line 3—3 of FIG. 2.

Referring now to FIGS. 2 and 3, there is shown an embodiment of the apparatus of the invention, generally indicated at 50, which employs the method of the invention shown in FIG. 1 and described above. Here, support member 22 for blades 12 is supported on base plate 52 and the blade assembly may be indexed about its axis 54 by index drive motor 56.

Mounting plate 58 is supported above base plate 52 by means such as posts 60. Spindle 62 is rotatably supported in sleeve member 64 by bearings 66, 68 and is rotatable about axis 28. Spindle 62 has central passage 70 formed therein coaxial with axis 28. Gun 32 is an elongated, curved tube 72 secured to spindle 62 and communicating with passage 70, tube 72 curving radially outwardly from axis 28 and downwardly from spindle 62, as shown. Spindle 62 and tube 72 are rotated about axis 28 and wire 34 is pushed through tube 74, passage 70 in tube 72 by wire pushing and tube rotating mechanism 76 which may be of the type more fully shown and described in U.S. Pat. No. 3,791,419 by Robert E. Arick and Ralph A. Vogel and assigned to the Assignee of the present application.

Annular confining member 78 having frusto-conical inner surface 80 coaxially surrounds dispensing end 36 of tube 72 and is radially spaced therefrom. Confining member 78 is supported for axial movement by bushings 82 mounted on guide posts 84 suspended from mounting plate 58. Confining member 78 is selectively moved, as shown by arrow 85, between a first, upper position, as shown in solid lines in FIG. 2, and a second, layer position, as shown in dashed lines at 86, by means of a hydraulic cylinder (not shown) mounted on mounting plate 58 and having its piston rod 88 attached to member 78. Slots 90 in confining member 78 receive distal ends 18 of blades 12 and permit movement of confining member 78 from its upper position to its lower position.

In the upper position of confining member 78, wire 46 pushed from dispensing end 36 of tube 72 impinges on inner surface 80 of member 78 at points lying on circle 92 (FIG. 3) thus confining the wire so pushed to a first circular path aligned with slots 16-1, 16-2. In the lower position of confining member 78, wire 46 pushed from dispensing end 36 of tube 72 impinges on surface 80 at points lying on circle 94 thus confining the wire so pushed to a circular path smaller than path 92 which is aligned with slots 16-3, 16-4 thereby placing two concentric coils, one within the other, on blades 12.

It will be readily understood that while confining member 78 has been shown and described as having two, i.e., upper and lower, positions thereby providing for the placing of two concentric coils on blades 12, confining member 78 may have one or more intermediate positions thereby providing for the placement of three or more concentric coils on blades 12.

Following the placing of one set of concentric coils on blades 12 as above described, the circular array of blades 12 may be rotated by index drive motor 56 to another rotational position and another set of coils placed on blades 12, as above described.

While axes 28 and 14 have been shown and described as being parallel, they may be relatively inclined.

While there have been described above the principles of this invention in connection with specific apparatus, it is to be clearly understood that this description is made only by way of example and not as a limitation to the scope of the invention.

What is claimed is:

1. Apparatus for placing magnet wire in slots respectively defined by the blades of coil transfer apparatus which lie on an imaginary cylinder in a cylindrical array to form a circular dynamoelectric machine field winding, said apparatus comprising means for guiding said wire toward said blades, means for pushing wire through said guide means without applying tension thereto, and means for moving said guide means relative to said blades in a circular path which overlaps said cylindrical array of blades and which is aligned with the open ends of two or said slots whereby said wire is pushed in a direction away from the center of said path and is also pushed into said two slots.

2. The apparatus of claim 1 wherein said blades respectively have distal ends and proximal ends mounted on a support member, said slots having open ends defined by said distal ends, said cylinder having a first axis, said guide means including a gun member having a dispensing end spaced from and extending generally radially with respect to a second axis which is spaced from said cylinder and parallel with said first axis, said dispensing end lying in a plane spaced from said distal ends on the side thereof remote from said support member, said moving means including means for rotating said dispensing end about said second axis whereby said dispensing end pushes said wire in said circular path, the spacing of said dispensing end from said second axis and the ratio of the speeds of said pushing and moving means being proportioned and arranged so that said path overlaps said cylinder and is aligned with said open ends of two of said slots whereby said wire is pushed into said two slots.

3. The apparatus of claim 2 wherein said gun member comprises an elongated tube having an end opposite said dispensing end, said opposite end being adjacent said pushing means and lying on said second axis.

4. The apparatus of claim 3 further comprising means concentrically surrounding said dispensing end and radially spaced therefrom for confining said wire in said path.

5. The method of placing magnet wire in slots respectively defined by the blades of coil insertion apparatus which lie on an imaginary cylinder in a cylindrical array to form a circular dynamoelectric machine field winding, said method comprising the steps of advancing said wire by pushing the same on its axis without applying tension thereto, and guiding said wire as it is being pushed in a circular path, which overlaps said cylindrical array of blades and which is aligned with the open ends of two of said slots whereby said wire is pushed in a direction away from the center of said path and is also pushed into said two slots.

6. The method of claim 5 wherein said path is about an axis spaced from said cylinder and parallel with said cylinder axis.

\* \* \* \* \*